US008097202B2

(12) United States Patent
Ferrier et al.

(10) Patent No.: US 8,097,202 B2
(45) Date of Patent: Jan. 17, 2012

(54) METHOD FOR MAKING A REFRACTORY CERAMIC MATERIAL HAVING A HIGH SOLIDUS TEMPERATURE

(75) Inventors: Mélusine Ferrier, Paris (FR); Pascal Piluso, Pertuis (FR)

(73) Assignee: Commissariat a l'Energie Atomique—CEA, Paris (FR)

( * ) Notice: Subject to any disclaimer, the term of this patent is extended or adjusted under 35 U.S.C. 154(b) by 0 days.

(21) Appl. No.: 12/520,736

(22) PCT Filed: Dec. 21, 2007

(86) PCT No.: PCT/FR2007/002147
§ 371 (c)(1),
(2), (4) Date: Jul. 29, 2009

(87) PCT Pub. No.: WO2008/096072
PCT Pub. Date: Aug. 14, 2008

(65) Prior Publication Data
US 2009/0315227 A1    Dec. 24, 2009

(30) Foreign Application Priority Data

Dec. 21, 2006  (FR) ...................................... 06 11177

(51) Int. Cl.
C04B 35/482    (2006.01)
C04B 38/00    (2006.01)
(52) U.S. Cl. ......................... 264/667; 264/632; 264/635
(58) Field of Classification Search .................. 264/632, 264/635, 667
See application file for complete search history.

(56) References Cited

U.S. PATENT DOCUMENTS

| 5,098,942 | A  | * | 3/1992 | Menke et al. ................. 524/314 |
| 5,681,784 | A  |  | 10/1997 | Friese |
| 6,340,650 | B1 | * | 1/2002 | Haun ............................ 501/155 |
| 2005/0112389 | A1 |  | 5/2005 | Loureiro et al. |
| 2007/0282068 | A1 | * | 12/2007 | Kauppi et al. .................. 525/98 |

FOREIGN PATENT DOCUMENTS

| EP | 0554637 | * | 8/1993 |
| EP | 1 772 441 A1 |  | 4/2007 |

* cited by examiner

Primary Examiner — Matthew Daniels
Assistant Examiner — Russell Kemmerle, III
(74) Attorney, Agent, or Firm — Browdy and Neimark, PLLC

(57) ABSTRACT

A powder metallurgy process for the manufacture of powders of a refractory ceramic material, comprising the consecutive steps of:
(i) obtaining a dry mixture of a hafnium dioxide $HfO_2$ powder and an yttrium oxide $Y_2O_3$ powder;
(ii) step of granulation by pelletization of the dry mixture under stirring in order to obtain a granulated mixture, this granulation step comprising the spraying, into the dry mixture, of an aqueous solution comprising polyvinyl alcohol (PVA) and polyethylene glycol (PEG);
(iii) drying of the granulated mixture;
(iv) filling of a mold with said granulated mixture;
(v) isostatical or semi-isostatical pressing of the granulated mixture in order to obtain a compact mixture;
(vi) sintering of the compact mixture in order to obtain a refractory ceramic material at a solidus temperature in the range between 2500° C. and 2800° C.

16 Claims, No Drawings

METHOD FOR MAKING A REFRACTORY CERAMIC MATERIAL HAVING A HIGH SOLIDUS TEMPERATURE

TECHNICAL FIELD

The present invention relates to the field of refractory materials, and relates in particular to a process for the manufacture of a refractory material having a high solidus temperature.

BACKGROUND ART

In a nuclear power plant, a failure in the means intended for the removal of residual power from the nuclear reactor may induce a loss in cooling of the nuclear fuel. In some circumstances, this loss may lead to partial or total core meltdown. The probability of such an accident, although extremely small, is not zero.

In order to prevent and manage the consequences of such an accident both on the population and the environment, a severe accident in a nuclear reactor core (in particular a Pressurized Water Reactor (PWR)) is simulated by melting sections of nuclear fuel rods that have previously been irradiated, in an induction furnace made of oxide-based refractory materials.

During such experiments, in which the temperature is varied (reaching up to 2600° C.) and the atmosphere is changed (for example, to neutral or oxidizing), the nuclear fuel behavior is studied, and the fission products and actinides which are released are identified and analyzed.

The oxide-based refractory parts of the furnace must at least fulfill the following criteria:
  mechanical strength up to a temperature of 2600° C.,
  tightness to gases generated during the experiment,
  chemical resistance to various types of atmosphere (in particular reducing, oxidizing, neutral, comprising air, water vapor),
  chemical resistance to corrosion and/or high temperature ablation, which may be caused by baths consisting of oxides and metals, for a duration of at least 15 minutes. Such interactions are generated, for example, when the refractory material is brought into contact with the corium. The latter is magma which results from the high-temperature meltdown of the nuclear fuel, followed by a reaction of the molten fuel with its cladding and the structural elements of the nuclear reactor. Most often, it is composed of corrosive baths of oxides and metals, heated-up above their melting point or solidus temperature. These oxides are, in particular, uranium, zirconium and iron oxides.

In order to fulfill such criteria, until 2003, the refractory parts of these furnaces were manufactured from thorium dioxide $ThO_2$, which oxide has a melting temperature of 3380° C.

However, since thorium dioxide $ThO_2$ is radioactive, it is difficult to implement and attempts are being made to replace it by another non-radioactive refractory material which also fulfills the above criteria. One candidate material is hafnium dioxide $HfO_2$.

Hafnium dioxide $HfO_2$ has three crystalline structures, each of which has its own stability domain as a function of temperature and pressure. At atmospheric pressure, these domains are as follows:
  below 1700° C.: monoclinic structure,
  from 1700° C. to 2600° C.: quadratic structure,
  from 2600° C. to 2810° C.: cubic structure,
  above 2810° C.: liquid state.

Hafnium dioxide $HfO_2$ has a melting point of 2810° C. and is also well known to withstand chemical interactions under heat. It therefore appears to be a good candidate for the replacement of thorium dioxide $ThO_2$ as a refractory material used in the composition of furnace parts enabling the above-mentioned simulations to be carried out.

However, pure hafnium dioxide $HfO_2$ has a major drawback in high temperature applications, in that, during thermal cycling (increasing/decreasing temperature), its allotropic transformation from the monoclinic phase to the quadratic phase is accompanied by a 3.4% shrinkage (or a volume expansion during the opposite transformation) between 1500° C. and 1800° C. As an unacceptable consequence of this large volume change, cracking of the refractory ceramic material consisting of hafnium dioxide $HfO_2$ occurs.

From U.S. Pat. No. 5,681,784, it is known that this volume change may be prevented by stabilizing the hafnium dioxide $HfO_2$ in its cubic phase (high temperature phase) by means of additives. For that purpose, to the hafnium dioxide $HfO_2$ material, 8 mol % to 12 mol % yttrium oxide $Y_2O_3$ and 0.25% to 4% by weight of sintering aids, are added. The material thus obtained has a low solidus temperature (well below 2500° C.), which makes it inappropriate for use as a constituent refractory material in the above-mentioned simulation furnaces.

SUMMARY OF THE INVENTION

It is accordingly an object of this invention to provide a powder metallurgy process for the manufacture of a hafnium dioxide $HfO_2$-based refractory ceramic material which does not crack during increasing and decreasing temperature cycling, which includes the range from 1500° C. to 1800° C.

A further object of this invention is to provide a powder metallurgy process for the manufacture of a hafnium dioxide $HfO_2$-based refractory ceramic material having a solidus temperature greater than 2500° C.

Therefore, an object of this invention is to provide a powder metallurgy process for the manufacture of a refractory ceramic material comprising:
  hafnium dioxide $HfO_2$ grains having a monoclinic structure;
  hafnium dioxide $HfO_2$ grains having a cubic structure which is stabilized by yttrium oxide $Y_2O_3$, the yttrium oxide $Y_2O_3$ representing 0.5 mol % to 8 mol % relative to the total number of moles of hafnium dioxide $HfO_2$;
  non-interconnected open pores;
  closed pores;
said method comprising the consecutive steps of:
  (i) obtaining a dry mixture of a hafnium dioxide $HfO_2$ powder and an yttrium oxide $Y_2O_3$ powder, each of these oxides being mixed in the molar proportions in which it is found in the ceramic material;
  (ii) step of granulation by pelletization of the dry mixture under stirring in order to obtain a granulated mixture, this granulation step comprising the spraying, into the dry mixture, of an aqueous solution comprising, relative to the weight of the dry mixture, 5% by weight of polyvinyl alcohol (PVA) having a molecular weight in the range between 50000 and 90000 g/mol and 5% by weight of polyethylene glycol (PEG) having a molecular weight in the range between 180 and 420 g/mol;
  (iii) drying of the granulated mixture;
  (iv) filling of a mold with said granulated mixture;
  (v) isostatical or semi-isostatical pressing of the granulated mixture in order to obtain a compact mixture;

(vi) sintering of the compact mixture in order to obtain the refractory ceramic material.

Advantageously, the solidus temperature of the refractory ceramic material obtained by the method according to the invention is in the range between 2500° C. and 2800° C. The solidus temperature is that temperature below which the last liquid portions of the solidifying material have solidified. It is determined at atmospheric pressure.

Furthermore, by "closed pores" are meant pores which do not communicate with the surface of the material, and by "open pores", pores which communicate with the surface of the material, these open pores having moreover the particular characteristic of not being interconnected. Optionally, part or all of the closed pores in the refractory ceramic material is not interconnected.

By isostatic pressing is meant the application of a uniform pressure, along any considered direction, to a powder contained within a flexible pressing bag generally maintained by a rigid support mold.

By semi-isostatic pressing is meant a pressing process whereby a punch applies a uniaxial pressure onto the most simple surface of the compact mixture and a flexible membrane applies an isostatic pressure onto the opposite side of the compact mixture, that is the side having a more complex geometry.

The isostatic and semi-isostatic pressing processes are particularly, although not exclusively, appropriate for the manufacture of tubes.

The PVA and PEG comprised in the aqueous solution act as a binder and a plasticizer, respectively.

Generally, the homogeneous distribution of a small amount of one powder within another is a delicate problem. This problem is even more complicated because the dry mixture of the present invention comprises two powders with rather different densities (namely, density of pure $HfO_2=9.68$ g·cm$^{-3}$; density of pure $Y_2O_3=5$ g·cm$^{-3}$).

However, it is very important to obtain a dry mixture wherein both of these powders are homogeneously distributed, since an increase in the $Y_2O_3$ content in a given area of the material may induce, after sintering, a large decrease in the solidus temperature within this area, and therefore, embrittlement of the entire ceramic material, imposing its use at temperatures lower than those expected.

The inventors have found that a step of granulation by pelletization alone, combined with the specific aqueous solution according to this invention, allows a granulated mixture to be produced wherein, on the one hand, the $HfO_2$ and $Y_2O_3$ powders are distributed homogeneously, and on the other hand, the dense granules have both sufficient mechanical strength to be manipulated and a deformation ratio enabling flattening to be carried out during the pressing step. According to this invention, by "granulation by pelletization" is meant a process wherein an organic suspension is sprayed onto a spinning ceramic powder within a slanted rotating table.

After drying, the obtained granulated mixture is sintered in order to obtain, by the process of this invention, a refractory ceramic material which is both composite (that is, the hafnium dioxide $HfO_2$ grains are of two types, namely grains of a monoclinic structure and of a cubic structure stabilized by yttrium oxide $Y_2O_3$), and homogeneous (these grains being distributed homogeneously throughout the entire volume of the material).

This material undergoes no cracking and a large proportion of its porosity is of the closed type. Without being bound to any particular theory, this unexpected closed porosity may be attributed to the Kirkendall effect, which is specific to the $HfO_2$—$Y_2O_3$ combination. Preferably, the closed pores represent 1% to 15% of the volume of the material obtained by the process of this invention.

Moreover, advantageously, the open pores in this material represent less than 3%, preferably less than 1%, and still more preferably about 0.5%, of the volume of the material. These open pores are not interconnected, so that they do not extend throughout the refractory ceramic material.

The large proportion of closed pores, as well as the fact that the open pores are not interconnected, enhances the gas tightness of the refractory ceramic material according to this invention and increases chemical resistance to gases and liquids by reducing the available exchange surface.

Unexpectedly, in spite of the significant amount of plasticizer contained in the aqueous solution, namely 5% by weight of polyethylene glycol (PEG), the ceramic material obtained by the process according to this invention is nonetheless sufficiently dense, with a measured compactness greater than 85%.

Advantageously, as a result of this compactness, the ceramic material according to this invention has an appropriate mechanical strength, in particular up to 2600° C., and it confines as well as possible the gases generated, for example, during the above-mentioned simulation experiments. The large proportion of closed pores also enhances the gas tightness of the material.

Since porosity is the complement of compactness, the ceramic material obtained by the process according to this invention thus has a porosity of 15% or less. This porosity can be accounted for by both non-interconnected open pores and closed pores. The measurement unit of compactness or porosity is in volume percent.

Open porosity is measured according to a method known to those skilled in the art such as the immersion method carried out using a vacuum chamber. Its subtraction from the total porosity leads to the closed porosity value.

As for the non-interconnected nature of the open porosity of the refractory ceramic material obtained by the process of this invention, this is assessed qualitatively based on methods known to those skilled in the art, which demonstrate the non-traversing nature of such pores.

Among those methods, is a tightness test such as the bubbling test. This test consists in immersing a material sample, such as a tube having one closed end, into a water container. Air is then blown under pressure into the tube with its closed end upwards. If the open porosity "traverses" the material, air will pass through the tube's wall until air bubbles form on its outer surface. However, if the open pores are not interconnected, the tube is airtight and no air bubbles will form.

Another method consists in cutting several cross-sections of the material and checking, from a picture taken with a secondary electron Scanning Electron Microscope (SEM), whether the open pores in this material are interconnected or not.

Preferably, this material is such that cubic hafnium dioxide $HfO_2$ is stabilized by 3 mol % to 8 mol %, or even 3 mol % to 5 mol % yttrium oxide $Y_2O_3$.

Still more preferably, this material is such that cubic hafnium dioxide $HfO_2$ is stabilized by 0.7 mol % to 1.5 mol % (preferably 1 mol %) yttrium oxide $Y_2O_3$, and then has a compactness in the range between 96% and 97%.

One of the fundamental characteristics of the refractory ceramic material according to this invention is the particular quantity of yttrium oxide $Y_2O_3$ it contains, namely a quantity of 0.5 mol % to 8 mol % relative to the total number of moles of hafnium dioxide $HfO_2$ (both monoclinic and cubic). Specifically, this quantity results in the material being composite, that is, comprising the hafnium dioxide $HfO_2$ in two distinct crystalline phases which are homogeneously distributed within the entire volume of the material, namely a phase comprising grains having a cubic structure (stabilized by yttrium oxide $Y_2O_3$) and a phase comprising grains having a monoclinic structure. Due to this composite nature, the material is only partially stabilized by the formation of a solid solution having a cubic structure.

The monoclinic nature of the hafnium dioxide $HfO_2$ grains or the cubic nature of the hafnium dioxide $HfO_2$ grains stabilized by yttrium oxide $Y_2O_3$ may be determined by X-ray diffraction.

Preferably, the microstructure of the refractory ceramic materials obtained by the process of this invention, which comprise 0.5 mol % to 8 mol % yttrium oxide $Y_2O_3$ is such that:
- the hafnium dioxide $HfO_2$ grains with a monoclinic structure have an elongated shape and/or an average size in the range between 1 μm and 3 μm,
- the hafnium dioxide $HfO_2$ grains with a cubic structure stabilized by yttrium oxide $Y_2O_3$ have a symmetrical shape with a square cross-section and/or an average size in the range between 3 μm and 15 μm.

These microstructural characteristics may in particular be determined from SEM pictures of the material, after processing according to a method known to those skilled in the art such as polishing followed by thermal or chemical etching at the grain boundaries.

The composite nature of the refractory ceramic material obtained by the process of this invention has the advantage of both i) avoiding the above-mentioned volume expansion and ii) preserving a solidus temperature as high as possible, and as close as possible to the melting temperature of pure hafnium dioxide $HfO_2$, while avoiding the addition of sintering aids.

For the materials comprising 1 mol % $Y_2O_3$ (for which, typically, the cubic hafnium dioxide $HfO_2$ grains are stabilized by 0.7 mol % to 1.5 mol % yttrium oxide $Y_2O_3$), the cubic hafnium dioxide $HfO_2$ grains are distributed in a particularly homogeneous manner throughout the volume of the ceramic material.

The distribution is particularly homogeneous in that it is not possible to detect any segregation or inclusions of the cubic hafnium dioxide $HfO_2$ phase, by means of a backscattered electron SEM picture, within the phase consisting of monoclinic hafnium dioxide $HfO_2$. This results in an increase of the cracking resistance during increases/decreases in temperature between 1500° C. and 1800° C.

As a result of this excellent homogeneity in the microstructure of the material, the latter does not contain areas in which the yttrium oxide $Y_2O_3$ is locally more concentrated than within the rest of the material. In other words, the 0.7 mol % to 1.5 mol %, preferably 1 mol %, yttrium oxide $Y_2O_3$ content is observed in practice throughout the volume of the material. This has the advantage that the solidus temperature is nearly the same throughout the material, namely of the order of 2800° C., and that it does not decrease locally due to a higher yttrium oxide $Y_2O_3$ content, which would generate hot spots acting as sources of mechanical brittleness in the material.

Further objects, features and advantages of the invention will become more apparent from the following description, which is non-limitative and given for the purpose of illustration.

Examples 1 and 2 below illustrate the manufacture, according to the method of the present invention, of a tube having a wall thickness which is respectively smaller or greater than 10 mm, this difference resulting, in particular, from processes using different pressing conditions.

DETAILED DESCRIPTION OF THE INVENTION

1—Powder Metallurgy Process for the Manufacture of a Tube Made of a Refractory Ceramic Material Comprising 3 mol % $Y_2O_3$ and Having a Wall Thickness Smaller than 10 mm.

1.1—Dry Mixing of the $HfO_2$ and $Y_2O_3$ Powders.

In order to make an $HfO_2$-based refractory ceramic material comprising 3 mol % $Y_2O_3$, 96.79 g of an $HfO_2$ powder and 3.21 g of a $Y_2O_3$ powder, representing 97 mol % and 3 mol % of the final mixture, respectively, were mixed together.

The hafnium dioxide $HfO_2$ powder available from CEZUS (France), had the following characteristics:
Purity=99.9% by weight.
Specific surface area (BET)=12.99 $m^2$/g.
Dense particle size (BET)=47.6 nm, calculated from the specific surface assuming the grains to be spherical.
Average grain size=2 μm, as measured by a wet process with a laser granulometer after adding ammonium polymethacrylate as a dispersant (marketed under the brand name DARWAN C).
Crystal system: mostly monoclinic (density=9.7 $g·cm^{-3}$).

The specific surface (BET) and the dense particle size (BET) were determined by nitrogen adsorption according to the ISO 9277:1995 standard established according to the Brunauer-Emmett-Teller (so-called BET) method.

The main chemical elements forming impurities (in ppm by weight relative to hafnium dioxide $HfO_2$) were as follows:

| |
|---|
| Al <100 |
| Ca <25 |
| Cd <20 |
| Mo <20 |
| Na <20 |
| Ni <100 |
| Co <20 |
| Cr <20 |
| Cu <100 |
| P <20 |
| Pb <20 |
| Sn <20 |
| Fe <100 |
| Mg <20 |
| Mn <0 |
| Ti <100 |
| V <20 |

The yttrium oxide $Y_2O_3$ powder, available from PIDC (USA), had the following characteristics:
Purity=99.999% by weight.
Density=5.01 $g·cm^{-3}$
Specific surface (BET)=2.38 $m^2$/g.
Dense particle size (BET)=0.5 μm, as calculated based on the specific surface and assuming the grains to be spherical.
Average grain size=3 μm, as measured by a wet process with a laser granulometer after adding DARWAN C as a dispersant.

The powders were mixed in the dry state by means of a non-specific ceramic powder mixer (here, of type Turbula®) for a minimum time period of 20 minutes.

1.2—Step of Granulation by Pelletization.

To perform the step of granulation by pelletization of the dry mixture of powders, stirring was maintained within a slanted rotating table while gradually spraying into the dry mixture of powders an aqueous solution comprising polyvinyl alcohol (PVA) having a molecular weight in the range between 50000 and 90000 g/mol and polyethylene glycol 300

(PEG 300), the sprayed quantities of PVA and PEG each representing 5% by weight based on the weight of the dry mixture of powders.

PEG 300 is a polyethylene glycol having a molecular weight in the range between 285 and 315 g/mol.

1.3—Drying.

The obtained granulated mixture was dried in an oven at 50° C. until the granules were dry which, in the present case, corresponds to a period of 20 minutes. A drying temperature in the range between 40° C. and 60° C. may also be appropriate. This avoids excessive hardening of the binder (PVA), which would make the granules incompressible during the pressing step.

1.4—Screening.

The granulated and dried mixture obtained by a "dry process" in the previous steps was then introduced into an automatic screening machine to be subjected to a double screening operation so that it contains only granules with a size in the range between 60 and 250 μm. This granule size is sufficiently large for its flow properties to permit correct filling of the mold. Also, it is small enough for the granules not to induce flaw of the pressing operation, such as a local lack of mixture which may lead to the appearance of a macropore, which would be impossible to remove during sintering.

1.5—Pressing.

To produce a compact mixture, a mold intended for semi-isostatic pressing of circular cylindrical tubes was used. This mold was composed of three main elements: i) a perforated metal body (support mold), ii) a flexible polyurethane plastic sheath 750 mm in length and with an internal diameter of 15.5 mm and iii) a cylindrical metal mandrel 600 mm in length and 9 mm in diameter. The metal body was perforated to allow the fluid (a water and oil mixture conventionally used in such presses) to apply a uniform pressure to the polyurethane plastic sheath.

Since the hafnium dioxide $HfO_2$ contained in the granulated mixture is very acidic, it may oxidize the ordinary steel of the metal mandrel, which may lead to its degradation, difficulties in demolding or pollution from the iron in the compact mixture. In order to avoid such oxidation, the entire surface of the mandrel is coated with 10 μm of a first chemical nickel layer, and then with 10 μm of a second polytetrafluoroethylene (Teflon) layer.

Thereafter, the mixture of granulated powders was introduced between the metal mandrel and the plastic sheath. To improve the compacting rate of the powder, mold filling was carried out slowly on a vibrating table, so as to avoid introducing defects, which would be impossible to remove during sintering.

The mixture of granulated powders was then subjected to the following pressing cycle:
 a pressure increase at a rate of 1.5 MPa/s up to a maximum pressure (known as a shaping stress plateau) of 200 MPa which was maintained for 120 s,
 a pressure decrease at a rate of 0.2 MPa/s down to atmospheric pressure.

Alternatively, the pressure increase up to the shaping stress plateau may be carried out according to at least one rate in the range between 0.5 and 2.5 MPa/s, the shaping stress plateau may be maintained for a duration in the range from 60 s to 180 s, and the pressure decrease down to atmospheric pressure may be performed according to at least one rate in the range between 0.1 and 1 MPa/s.

During the pressing step, the granulated mixture was compressed between the stationary mandrel and the flexible sheath.

When the cylindrical compact tube has a wall thickness smaller than 10 mm, the maximum pressure is at least 200 MPa in order to obtain a sufficiently compact material and in any case should not exceed 250 MPa so as to prevent any cracking of the material after sintering.

After this pressing step, a compact tube was obtained with the following dimensions: length=600 mm, external diameter=12 mm and internal diameter=9 mm.

1.6—Sintering.

The compact tube was sintered in air according to the following cycle: an increase in temperature at a rate of 5° C./min up to a temperature of 1600° C., which was maintained at this value for 1 hour, followed by a decrease in temperature at the natural cooling rate of the furnace. Advantageously, since the compact tube has a wall thickness of less than 10 mm, the binder (PVA) and plasticizer (PEG) were removed from the compact mixture by pyrolysis during the sintering step.

After sintering, a cylindrical tube of circular cross-section made of refractory ceramic material 8.3 mm in external diameter and 6.8 mm in internal diameter was obtained. It should be noted that other cylindrical tubes having a non circular, for example elliptical, cross-section could also be made, with only the cylindrical tubes having edges being difficult to produce through semi-isostatic or isostatic pressing.

Various sintering cycles under an air atmosphere were tested to assess the influence of the temperature and the time plateau on compactness and open porosity. Thanks to these tests it was possible to determine that another sintering cycle, which may also be appropriate, comprises heating the compact mixture to a temperature in the range between 1550° C. and 1650° C., for a duration in the range between 30 minutes and 90 minutes. If such conditions are not fulfilled, an open porosity ratio which is unsuitable for the containment of gases might be obtained.

Moreover, the inventors have shown that for the same sintering cycle, the larger the yttrium oxide $Y_2O_3$ content, the smaller the sintering shrinkage and the higher the temperature at which the compact mixture begins to densify (900° C. for a compact pure $HfO_2$ mixture, as opposed to 1200° C. for a compact $HfO_2$ mixture comprising 8 mol % $Y_2O_3$).

Advantageously, the solidus temperatures of the refractory ceramic material of this invention must be in the range between 2500° C. and 2800° C. To obtain this material with sufficient compactness, it is therefore expected that a high sintering temperature should be applied, which will in any case be much larger than the upper bound that can be reached by standard sintering furnaces which, in general, never exceed 1700° C. to 1800° C.

Even though other furnaces may generate temperatures in excess of 1800° C., they generally work under a controlled atmosphere and have rarely been developed in this industry. These furnaces most often use heating elements and refractory materials made of carbon. However, carbon interacts with hafnium dioxide $HfO_2$, thus making the use of such furnaces inappropriate for sintering a mixture of powders comprising $HfO_2$.

Unexpectedly, although the sintering step according to this invention comprises heating at temperatures in the vicinity of 1600° C., it nevertheless makes it possible to obtain a sufficiently compact ceramic material with a large closed porosity ratio. This also allows standard furnaces to be employed and prevents any detrimental interaction with carbon.

It should be noted that the open pores in the material according to this invention were found to be open pores which are not interconnected and are thus non-traversing. In other words, these pores within the cylindrical tube wall had sufficiently small dimensions for the internal volume of the tube not to communicate with its external volume, thus ensuring perfect impermeability between both volumes. Therefore, this enhances the desired gas containment for parts in simulation oven.

1.7—Machining-Grinding.

In order to make a structural part for a simulation furnace, the refractory ceramic material tube obtained in the previous step was ground to the required dimensions by machining. The machining did not generate any cracking in the material.

2—Powder Metallurgy Process for the Manufacture of a Cylindrical Tube Made of Refractory Ceramic Material Comprising 3 mol % $Y_2O_3$ and Having a Wall Thickness Greater than 10 mm.

To take into account specific problems encountered during the manufacture of a compact mixture having a geometry such that it has a thickness of more than 10 mm in at least one cross-sectional plane, the manufacturing process of the preceding example was modified so as to make a cylindrical tube with wall thickness greater than 10 mm.

2.1—Pressing Cycle.

The semi-isostatic press comprised a polyurethane sheath 30 mm in length and with an internal diameter of 60 mm, in addition to a cylindrical metal mandrel 125 mm in length and 20.8 mm in diameter.

To obtain a refractory ceramic material which is both dense (that is, with a compactness greater than 85%), shows no stacking defect and does not undergo cracking, the pressing cycle of the preceding example was modified by applying a maximum pressure (also referred to as the plateau shaping stress) of 100 MPa and performing a decrease in said pressure in two steps, in order to make it more gradual.

The protocol used was as follows:

a pressure increase at a rate of 1.5 MPa/s up to the maximum pressure (known as the shaping stress plateau) of 100 MPa which was maintained for 120 s, a decrease in this maximum pressure at a rate of 0.5 MPa/s in order to reach an intermediate pressure of 30 MPa, and then resumption of the pressure decrease at a rate of 0.2 MPa/s down to atmospheric pressure.

Alternatively, the decrease in the plateau shaping stress may be performed at rate in the range between 0.2 and 1 MPa/s in order to reach an intermediate pressure of 30 MPa, and the decrease in the intermediate pressure may be carried out at a rate in the range between 0.1 and 0.5 MPa/s down to atmospheric pressure.

The maximum pressure may be at least 80 MPa so as to obtain a sufficiently compact material and in any case should not exceed 150 MPa so as to prevent any cracking of the material after sintering.

After this pressing step, a compact cylindrical tube of circular cross-section was obtained with the following dimensions: length=130 mm, external diameter=48 mm and internal diameter=20.8 mm.

2.2—Debinding.

Between the pressing and sintering steps, a debinding step was added to allow for the removal of the large quantity (resulting from the large thickness of the tube) of binder (PVA) and plasticizer (PEG) contained in the compact tube. This removal should be gradual enough to prevent any cracking of the refractory ceramic material during the sintering step.

The debinding step comprised increasing the temperature of the compact tube at a rate of 0.2° C./min (which rate may be in the range between 0.1° C./min and 0.5° C./min) up to a temperature of 600° C. (which temperature may be in the range between 550° C. and 650° C.) which was maintained for 2 hours (which duration may be in the range between 1 and 3 hours).

2.3—Opening the Cylindrical Tube.

As is commonly done in the manufacture of a cylindrical tube by semi-isostatic or isostatic pressing, an excess of the granulated mixture was added in order to produce a "plug" above the mandrel and obtain, after sintering, a cylindrical tube with one of its ends closed, that is, a cylindrical tube in the form of a crucible. The closed compact cylindrical tube obtained after pressing nevertheless had a geometry defect at each of its ends, in that each end widened with respect to the average diameter of the cylindrical tube (this flare is commonly known as a "bell-bottom" in the field of ceramics). This defect is commonly observed when the sheath is not snuggly fitted to the perforated metal body. It generates large stresses during debinding and sintering, and may cause cracking of the tube made of refractory ceramic material as obtained after sintering.

In order to avoid such cracking, between the pressing and debinding steps, the compact cylindrical tube was cut crosswise in the dry state at each of its ends, so as not to show this flared shape at its ends and so that the tube diameter was substantially the same along its entire length.

From the above description, it clearly appears that the specific process of this invention allows a part to be manufactured using a refractory ceramic material, which does not undergo any cracking during temperature increase/decrease cycles including the range from 1500° C. to 1800° C., and which has a solidus temperature greater than 2500° C.

The invention claimed is:

1. A powder metallurgy process for the manufacture of a refractory ceramic material comprising:
   hafnium dioxide $HfO_2$ grains having a monoclinic structure;
   hafnium dioxide $HfO_2$ grains having a cubic structure, which is stabilized by yttrium oxide $Y_2O_3$, said yttrium oxide $Y_2O_3$ representing 0.5 mol % to 8 mol % relative to the total number of moles of hafnium dioxide $HfO_2$;
   non-interconnected open pores;
   closed pores;
   said process comprising the consecutive steps of:
   (i) obtaining a dry mixture of a hafnium dioxide $HfO_2$ powder and an yttrium oxide $Y_2O_3$ powder, each of these oxides being mixed in the molar proportions in which it is found in said ceramic material;
   (ii) step of granulation by pelletization of said dry mixture under stirring in order to obtain a granulated mixture, said granulation step comprising the spraying, into the dry mixture, of an aqueous solution comprising, relative to the weight of the dry mixture, 5% by weight of polyvinyl alcohol (PVA) binder having a molecular weight in the range between 50000 and 90000 g/mol and 5% by weight of polyethylene glycol (PEG) plasticizer having a molecular weight in the range between 180 and 420 g/mol;
   (iii) drying of said granulated mixture;
   (iv) filling of a mold with said granulated mixture;
   (v) isostatical or semi-isostatical pressing of said granulated mixture filling said mold, in order to obtain a compact mixture;
   (vi) sintering of said compact mixture in order to obtain said refractory ceramic material comprising grains having a cubic structure and grains having a noncubic structure.

2. The powder metallurgy manufacturing process according to claim 1, characterized in that said pressing comprises the consecutive steps of:
increase of the pressure up to a plateau shaping stress, according to at least one rate in the range between 0.5 and 2.5 MPa/s;
maintenance of said shaping stress plateau for a duration in the range between 60 s and 180 s;
decrease of the pressure down to atmospheric pressure, according to at least one rate in the range between 0.1 and 1 MPa/s.

3. The powder metallurgy manufacturing process according to claim 2, characterized in that said shaping stress plateau is in the range between 200 and 250 MPa.

4. An application of the process of claim 3, in which said compact mixture is a compact cylindrical tube with a wall having a thickness smaller than 10 mm.

5. The powder metallurgy manufacturing process according to claim 2, characterized in that said shaping stress plateau is in the range between 80 and 150 MPa.

6. The powder metallurgy manufacturing process according to claim 5, characterized in that said decrease of the pressure comprises:
decreasing said shaping stress plateau at a rate in the range between 0.2 and 1 MPa/s, in order to reach an intermediate pressure of 30 MPa; and then
decreasing said intermediate pressure at a rate in the range between 0.1 et 0.5 MPa/s down to atmospheric pressure.

7. The powder metallurgy manufacturing process according to claim 5, characterized in that between said pressing and sintering steps, a debinding step is performed, which comprises increasing the temperature of said compact mixture at a rate in the range between 0.1° C./min and 0.5° C./min until a temperature in the range between 550° C. and 650° C. is reached for a duration in the range between 1 and 3 hours.

8. The powder metallurgy manufacturing process according to claim 5, characterized in that said compact mixture is a compact cylindrical tube and in that, after said pressing step and before said sintering or debinding step, said tube is cut crosswise so that it no longer shows a flaring shape at its ends.

9. An application of the process of claim 5, in which said compact mixture is a compact cylindrical tube with a wall having a thickness greater than 10 mm.

10. The powder metallurgy manufacturing process according to claim 1, characterized in that before said filling step, the surface of any metal member of said mold to be brought into contact with said granulated mixture during said pressing step is coated with a first layer of chemical nickel followed by a second layer of polytetrafluoroethylene.

11. The powder metallurgy manufacturing process according to claim 1, characterized in that said aqueous solution comprises, relative to the weight of said dry mixture, 5% by weight of polyvinyl alcohol (PVA) having a molecular weight in the range between 50000 and 90000 g/mol and 5% by weight of polyethylene glycol having a molecular weight in the range between 285 and 315 g/mol (PEG 300).

12. The powder metallurgy manufacturing process according to claim 1, characterized in that said mixing step (i) and/or granulation step (ii) are carried out by stirring said powders and/or said dry mixture by means of a ceramic powder mixer.

13. The powder metallurgy manufacturing process according to claim 1, characterized in that said drying comprises heating said mixture to a temperature in the range between 40° C. and 60° C.

14. The powder metallurgy manufacturing process according to claim 1, characterized in that after said drying step and before said pressing step, said granulated mixture is screened so that it contains only granules with a size in the range between 60 and 250 μm.

15. The powder metallurgy manufacturing process according to claim 1, characterized in that said sintering comprises heating said compact mixture to a temperature in the range between 1550° C. and 1650° C. for a duration in the range between 30 minutes and 90 minutes.

16. The powder metallurgy manufacturing process according to claim 1, characterized in that after the sintering step, it further comprises the step of machining (vii) said refractory ceramic material.

* * * * *